United States Patent [19]

Theodore et al.

[11] Patent Number: 4,568,502

[45] Date of Patent: Feb. 4, 1986

[54] PROCESS FOR MOLDING COMPLEX BETA"-ALUMINA SHAPES FOR SODIUM/SULFUR BATTERIES

[75] Inventors: Ares N. Theodore, Farmington Hills; Robert A. Pett, Franklin, both of Mich.

[73] Assignee: Ford Motor Company, Dearborn, Mich.

[21] Appl. No.: 553,413

[22] Filed: Nov. 18, 1983

Related U.S. Application Data

[63] Continuation of Ser. No. 397,003, Jul. 12, 1982, abandoned, which is a continuation-in-part of Ser. No. 300,368, Sep. 8, 1981, abandoned.

[51] Int. Cl.[4] .............................................. C04B 35/64
[52] U.S. Cl. ........................................ 264/63; 264/44; 264/59
[58] Field of Search ................... 264/63, 61, 332, 44, 264/59

[56] References Cited

U.S. PATENT DOCUMENTS

| | | | |
|---|---|---|---|
| 2,644,799 | 7/1953 | Robinson | 264/279.1 |
| 3,445,250 | 5/1969 | Preece | 264/211 |
| 3,687,735 | 8/1979 | Inoue | 264/61 |
| 3,803,279 | 4/1974 | Bailey, Jr. et al. | 264/236 |
| 3,846,540 | 11/1974 | Leech | 264/211 |
| 4,158,688 | 6/1979 | Pett | 264/63 |
| 4,158,689 | 6/1979 | Pett | 264/63 |
| 4,265,794 | 5/1981 | Pett | 260/28.5 R |
| 4,267,086 | 5/1981 | Pett | 260/28.5 R |

OTHER PUBLICATIONS

"The Technology of Ceramics and Refractories" pp. 196–216 (Chap. IV) P. P. Budnikov, MIT Press 1964.
Morton, *Rubber Technology*, pp. 515–533, 1973.

*Primary Examiner*—Donald Czaja
*Assistant Examiner*—Mary Lynn Fertig
*Attorney, Agent, or Firm*—Lorraine S. Melotik; Roger L. May

[57] ABSTRACT

This invention relates to a compression molding method of preparing dimensionally precise highly contoured green bodies from a mixture of beta"-alumina percursor particulate and sacrificial binder. The binder comprises a thermoplastic block copolymer, oil, wax, stiffening molding, the green body may be heated to drive off the sacrificial binder and thereafter subjected to sintering. Such sintered articles are suitable for use in a sodium-sulfur battery.

25 Claims, 4 Drawing Figures

PROCESS FOR MOLDING COMPLEX BETA″-ALUMINA SHAPES FOR SODIUM/SULFUR BATTERIES

This application is a continuation of application Ser. No. 397,003, filed July 12, 1982, now abandoned, which is a continuation-in-part of application U.S. Ser. No. 300,368, filed Sept. 8, 1981, now abandoned.

Reference is made to commonly assigned related U.S. applications Ser. Nos. 300,369, now abandoned, entitled "Preparation of Beta″-Alumina Tube by the Extrusion Process" to Theodore et al and Ser. No. 300,404, now U.S. Pat. No. 4,364,783, entitled "Ultrasonic End-Capping of Beta″-Alumina Tubes" to Theodore et al, both filed Sept. 8, 1981.

BACKGROUND OF THE INVENTION

This invention relates to preparation of sintered articles. This invention, more specifically, relates to preparation of precursors, also known as green bodies, for such sintered articles. This invention, still more specifically relates to the preparation of dimensionally precise, complexly shaped, green bodies prepared from beta″-alumina precursor particulate and sacrifical binder.

Isostatic pressing of sinterable particulate solids is a known technique for preparation of sinterable articles not having complex configurations. For articles having complex shapes, e.g. flanges, isostatic pressing is unsuitable since it does not yield consistently desirable green bodies and sintered articles.

U.S. Pat. Nos. 4,158,688 and 4,158,689 to Pett et al, which are commonly assigned with this application, disclose preparation of green bodies of unusual dimensional precision using sacrificial binders similar to that of this invention. In these patents, the green bodies formed include compression molded cordierite ribbed sheets and extrusion molded beta″-alumina precursor particulate tubes. However, neither the binder composition used with the cordierite nor the extrusion composition used to make the tubes is optimal for use in compression molding of the beta″-alumina precursor particulate green bodies of the subject invention.

Particulate solids such as beta″-alumina ceramic precursor particulate have special properties inhibiting their facile shaping into dense, highly contoured sintered articles. As opposed to cordierite particulate solids, they are not as readily wetted by the binder ingredients. Furthermore, certain forms of such beta″-alumina precursor particulates inhibit the flow of sacrificial binder compositions containing them. Thus, in compression molding, there is a tendency of sacrificial binder compositions (containing sufficiently high amounts of particulate to prepare a dense ceramic) to resist flow into complex shapes or give articles with surface imperfections, if such a resistance to flow can be overcome.

This invention permits improvement in the compression molding of sacrificial binder compositions, densely packed with powdered beta″-alumina precursor particulate solids, into sound, dimensionally precise, complexly shaped green bodies.

BRIEF DESCRIPTION OF THE INVENTION

This invention relates to a compression molding method for preparing dimensionally precise, highly contoured green bodies. The method comprises: providing a mixture of about 40-60 volume percent of sinterable particulate solids consisting essentially of a particle size distribution of beta″-alumina precursor particulate comprising alpha-alumina and about 60-40 volume percent of organic sacrificial binder in a mold member having a cavity and a recess in the cavity, the mixture being located such that a first amount is provided in the cavity adjacent the recess and a second amount is provided in the recess; applying heat and pressure to the first and second amounts between the mold member and another mold member to urge together the first and second amounts; and maintaining the heat and pressure for a time sufficient to knit together portions of the first and second amounts in conformity with the cavity.

The binder employed in the process consists essentially of (a) a thermoplastic block copolymer component selected from the group consisting of linear, radial and linear and radial block copolymers, the block copolymers having a first aromatic block which is glassy or crystalline at 20°–25° C., and which has a softening point between about 80°–250° C. and a second aliphatic block which is different from the first block and behaves as an elastomer at temperatures between about 15° C. below and about 100° C. above the softening point of the first block; (b) two oils having different boiling point ranges and being selected from the group consisting of oil at least about 75 percent by weight of which boils in a range between about 285°–560° C., and which has a viscosity of between about 30–220 Saybolt Universal Seconds (SUS) at 100° C., and an aniline point in a range between about 75°–125° C.; (c) two waxes having different boiling point ranges and being selected from the group consisting of wax, which melts at a temperature in a range between about 55° C.–80° C., and at least 75 percent by weight which boils at temperatures in a range between about 315° C.–490° C.; (d) a first stiffening thermoplastic polymer which is glassy or crystalline at 20°–25° C., has a softening point between about 80°–250° C.; and comprises aromatic monomeric units associable with monomeric units of block copolymer (a); and (e) a second stiffening polymer, different from the first polymer, and which is glassy or crystalline at 20°–25°, has a softening point between about 80°–250° C. and comprises aromatic monomeric units associable with the block copolymer (a). In the binder composition, the weight of (a) is greater than (b) and (c) combined, greater than (d) and (e) combined and greater than about two times (b), (c), (d) or (e) alone. Surfaces of the mold which contact the moldable mixture during the molding process are coated, prior to molding, with a mold release agent.

In a preferred compression molding method in accordance with this invention, the method comprises providing the mixture, wherein the thermoplastic block copolymer component consists essentially of a radial block copolymer, in a first mold member having a cavity and a recess adjacent the perimeter of the mold in the cavity, the mixture being located such that a first amount is provided in the cavity adjacent the recess and a second amount is provided in the recess. It further comprises providing the mixture in a second mold member, having a cavity and a recess adjacent the perimeter of the mold, in the cavity such that a third amount is provided in the recess. The recesses of the first and second mold members align when the mold members are brought together.

The improved method of the invention will be fully understood from the following detailed description of the invention when read in conjunction with the drawings.

BRIEF DESCRIPTION OF THE DRAWING

FIG. 1 is a perspective view. FIGS. 2 and 3 are top and bottom planar views.

DETAILED DESCRIPTION OF THE INVENTION

As discussed above, the improved method of the invention relates to the compression molding of a mixture of sinterable particulate and sacrificial binder into dimensionally precise, high contoured green bodies. Each of the components of the mixture within the scope of the invention as well as the processing steps are described hereinafter in greater detail.

Figure 3:
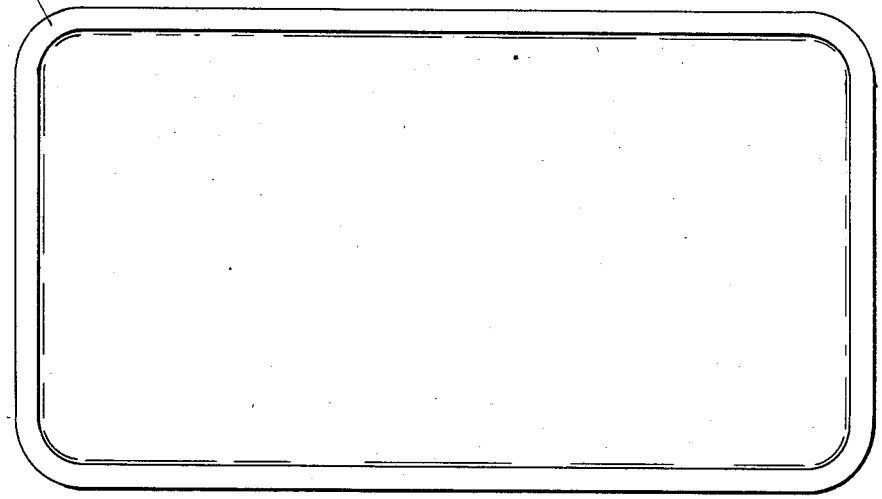
Figure 4:
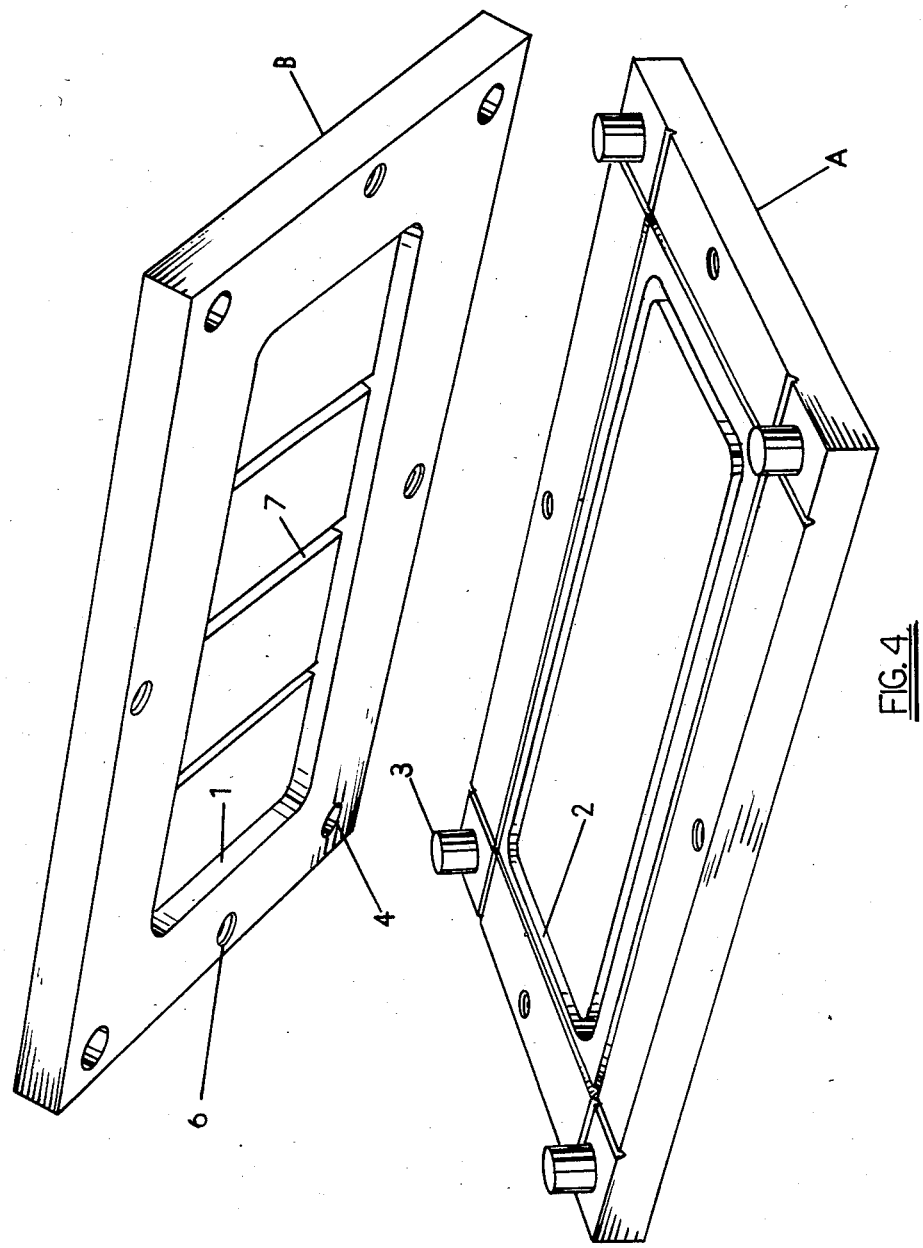
FIG. 4 illustrates the first and second plate mold members used in making the preferred green body of FIGS. 1, 2 and 3.

In this process, the beta"-alumina percursor particulate is mixed with the binder ingredients on a roll mill, after which preform strips and rectangles are cut from a milled sheet. In one embodiment of the preferred process, and as detailed in Example 1, three of these rectangular preforms are stacked in the middle of bottom mold plate A depicted in FIG. 4. However, either mold plate A or mold plate B may be used as the bottom mold plate with respect to these rectangular preforms. Four preform strips are placed into the edge recesses of the top mold plate and four preform strips are placed into the edge recesses 2 of the bottom mold plate. The molds are preheated prior to placement of the preforms therein. The mold is then assembled by means of corner pin 3 and hole 4 which brings into alignment edge recess 1 of the top plate and recess 2 of the bottom plate, which mold recesses will result in the formation of the green body edge 5 shown in perspective view in FIG. 1 and in top and bottom views of the green body in FIGS. 2 and 3. In this preferred embodiment, the top and bottom mold cavities are similar. However, the depth of the cavity of mold plate B is greater than the depth of the cavity of mold plate A, as depicted in FIG. 4. The cavity of top mold plate B additionally contains three parallel depressions 7, which will generate ribs 8 of the green body, shown in FIGS. 1 and 2. These ribs add structural strength to the green body.

Figure 2:
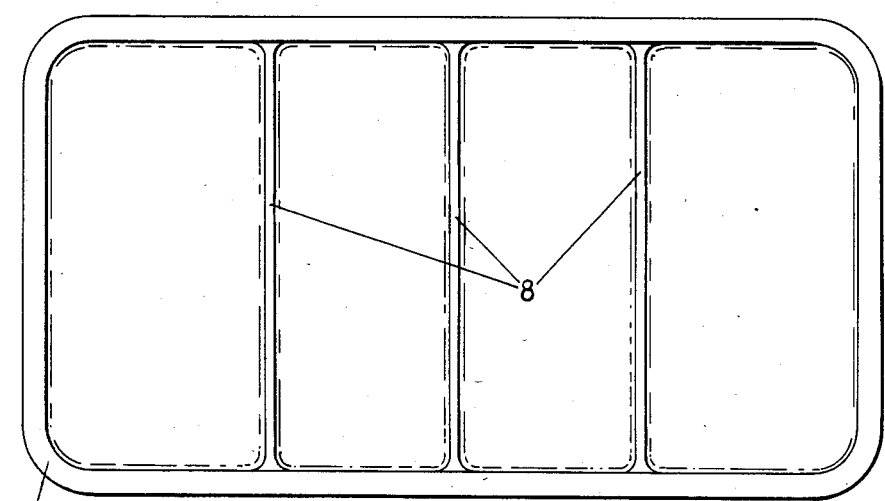

The assembled mold is subject to heat and pressure and any excess material is forced out of the mold. In the preferred embodiment described above, optimal molding of the body is obtained when employing a molding pressure between about 125-370 lbs/in$^2$, preferably between about 215-295 lbs/in$^2$. While these pressures have been found optimal for use in the preferred embodiment process (i.e., employing the particular ribbed mold taught in the Examples) selection of optimal molding pressures of other process embodiments (i.e., employing other molds) would be well within the skill of one in the art, and is not limited to these ranges, nor would these ranges necessarily be preferred. After terminating the pressure and cooling the mold, the four set screws 6 of the top mold plate are turned against the bottom mold plate in order to open the mold evenly. FIG. 3 illustrates the bottom view of the green body which will be formed by bottom mold plate A, and FIG. 2 illustrates the top view of the green body which will be formed by top mold plate B. The green bodies can be stored in polyethylene bags. Prior to use, as for example, in the sodium/sulfur battery, the green bodies are subjected to binder burn out followed by sintering of the ceramic particulate.

SACRIFICIAL BINDER

The sacrificial binders of this invention comprises a major amount by weight of a block copolymer thermoplastic elastomer, plasticizer therefor and thermoplastic polymer.

The block copolymer may be a linear block copolymer such as is disclosed in U.S. Pat. No. 4,158,689, a radial block copolymer such as is disclosed in U.S. Pat. No. 4,158,688, or a combination of these block copolymers. The disclosures of U.S. Pat. Nos. 4,158,688 and 4,158,689 are hereby incorporated by reference.

Suitable radial block polymers for use in this invention are those having the structural formula

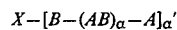

$$X-[B-(AB)_\alpha-A]_{\alpha'}$$

wherein "X" is a linking group, A or B, "$\alpha$" is 0 or a positive integer, "$\alpha'$" is a positive integer greater than 2, "A" is a linear or branched polymer that is glassy or crystalline at room temperature 20°-25° C. and has its softening point in the range of about 80° C. to about 250° C. and "B" is a polymer different from "A" that behaves as an elastomer at processing temperatures, i.e., between about 15° C. below and about 100° C. above the softening point of "A".

Suitable linear block polymers for use in this invention are those having the structural formula

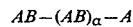

$$AB-(AB)_\alpha-A$$

wherein "$\alpha$" is 0 or a positive integer, "A" is a linear or branched polymer that is glassy or crystalline at room temperature and has a softening point in the range of about 80° C. to about 250° C. and "B" is a polymer different from "A" that behaves as an elastomer at processing temperatures.

Linear and radial block copolymers are widely known. Commercially available linear and radial block copolymers are Kratons and Solprenes, respectively. Kraton is a tradename of Shell Oil Company and Solprene is a tradename of Phillips Petroleum Company. Other examles of these polymers appear in *Rubber Technology*, "Thermoplastic Elastomers," Hendricks et al, 2nd Edition, pp. 515-533, VAN NOST RAND, N.Y. (1973) and *Rubber World*, "Compounding Radial Block Copolymers."

The binders of this invention preferably comprise a block copolymer consisting essentially of thermoplastic radial block copolymer. Of the radial block copolymers, those with aforedescribed "A" and "B" blocks are preferred, with aromatic "A" block and aliphatic "B" block being preferred. Other "A" and "B" blocks appear in Col. 2, line 56 through Col. 3, line 3 of U.S. Pat. No. 4,158,688. The preferred radial block copolymers, suitable for use in this invention have molecular weights ($\overline{M}_w$) of about 100,000-200,000, a specific gravity between 0.9-1., and an apparent viscosity of between about 40-50 thousand poise at 10 seconds$^{-1}$ at about 20°-25° C.

The molecular weights of the "A" segments and the "B" segments of the block copolymers suitable for use in the method of this invention will vary with the polymer segment involved as will be obvious to one skilled in the art in that physical characteristics must be met as hereinbefore recited. For instance, where the block copolymer has polystyrene "A" blocks and polybutadiene "B" blocks, preferrably unsaturated polylbutadiene, the polystyrene segments advantageously have number average molecular weights ($\overline{M}_n$) below about 20,000 and at least two of such segments have molecular weights ($\overline{M}_n$) above about 10,000. While the polybutadiene segments advantageously have molecular weights ($\overline{M}_n$) below about 80,000 and at least one such segment has a molecular weight ($\overline{M}_n$) above about 15,000. The lower limit of molecular weight ($\overline{M}_n$) for the two "A" blocks is governed by the minimum "A" block chain length required to insure the formation of a heterogeneous phase while the upper limit of "A" blocks is set by the viscosity of both "A" and "B" blocks when such viscosity begins to hamper domain formation of processing.

The sacrifical binder employed in the method of this invention includes a plasticizer comprising oil and a wax in combination. The oils and waxes used for this purpose are naphthenic, paraffinic or a mixture of paraffinic and naphthenic constituents. They are sufficiently volatile to be removed easily and rapidly in the burn-out process but insufficiently volatile to be substantially removed during mixing and/or molding. The loss due to volatilization during mixing and/or molding is advantageously below 20 and preferably below 10 weight percent. The selection is such that their evolution during burn out takes place over a broad temperature range, thus avoiding stress points and defects in parts.

Functionally, the oils and waxes must be compatible with the rubbery phase of the principal binder resin when it becomes rubbery on plasticization at a temperature somewhat below the softening point of the "A" segments of the principal resin. This gives the binder a capability of accepting higher filler loadings while remaining strong and flexible.

At least 75% by weight of the oils used as plasticizers boil in the range of about 285° C. to about 560° C., preferably in the range of about 285° C. to about 465° C. They have viscosities at 100° C. in the range of about 30 to about 220 Saybolt Universal Seconds, hereinafter referred to as S.U.S., advantageously in the range of about 35 to about 155 S.U.S., and preferably in the range of about 35 to about 80 S.U.S. These oils have an Aniline Point in the range of about 75° C. to about 125° C. The oils may be a product of petroleum refining operations or vegetable or animal oils and they may include or be low molecular weight synthetic polymers such as polystyrene, poly(alpha-methyl styrene), or a polyolefin. Examples of suitable commercially available oils include Flexon 580, 680, 765 and 845 marketed by Exxon and Shellflex 131, 371 and 790 marketed by Shell Chemical Co.

The waxes used have melting points in the range of about 55° C. to about 80° C. At least about 75% by weight of such wax boils at temperatures in the range of about 315° C. to about 490° C. These may be a product of petroleum refining operations, vegetable or animal oils or synthetic polymers such as low molecular weight polyolefins. Examples of suitable commercially available waxes are Sunoco Wax 3420, 4412 and 4418 marketed by Sun Chemical as well as paraffin wax (M.P. 54° C.) marketed by International Wax Refining.

The binder of this invention further includes a first and a second stiffening thermoplastic polymer which are glassy or crystalline at 20°-25° C., have a softening point between about 80°-250° C. and comprise aromatic monomeric units associable with the block copolymer. The stiffening polymer preferably has a molecular weight in the range between about 50,000 and 400,000, more preferably 100,000 and 300,000, wherein such molecular weight refers to a weight average molecular weight (Flory). The second stiffening polymer is different from the first stiffening polymer and also functions as a tackifying thermoplastic polymer. Preferred second stiffening polymers have a melt viscosity of about 10 poises at 157°-205° C.

For example, if the "A" block of the block copolymer is a polystyrene, then the first stiffening thermoplastic polymer preferably is a polystyrene or other thermoplastic aromatic polymer. In addition to stiffening, such a thermoplastic polymer should also aid in mixing the sacrificial binder composition ingredients. A thermoplastic polystyrene polymer such as Styron 495, marketed by Dow Chemical Company, does this because it has a lower viscosity than the thermoplastic block copolymer at processing conditions; on the other hand it is sufficiently crystalline at room temperature to advantageously stiffen the formed green body. Furthermore, according to this example, if the first stiffening polymer is polystyrene as mentioned, the second stiffening polymer is aromatic but has a different aromatic moiety, e.g., indene. A preferred second polymer is polyindene. Low molecular weight polyidenes have the further advantage of low viscosity at processing conditions. The low viscosity aids flow of the sacrifical binder compositions.

Using two different polymers also advantageously permits the sequential expulsion of the stiffening polymers during firing of the green bodies.

In this particulate binder mixture, the weight of the thermoplastic block copolymer is greater than the weight of the oil and wax combined, and greater than the weight of the stiffening polymers combined. The weight of the block copolymer is also greater than two times the weight of the oil, the wax, the first stiffening polymer or the second stiffening polymer alone.

Other ingredients may be employed in the binders of this invention. For example, antioxidants are useful to retard oxidative degradation of the block polymer during mixing, thus minimizing loss of strength in the green body. The antioxidant also allows more rapid removal of binder during burn-off by minimizing surface oxidation which may tend to seal off the surface. Suitable antioxidants include, but not by way of limitation, 2,6-ditert-butyl-phenol, a polymerized 1,2-dihydro-2,2,4-trimethyl quinoline, 2-mercaptobenzimidazole, tetrabis-methylene-3-(3,5-ditert-butyl-4-hydroxy phenyl) propionate methane, etc.

Process aids which are conventional to molding and forming operations which polymeric materials are likewise useful in the practice of this invention. They may be sprayed on the mold or incorporated into the mixture to improve the release characteristics of the green body from the molding apparatus with which the green body comes in contact. When incorporated into the mixture, they can also be used to improve the flow characteristics of the binder-filler mixture during molding operations. Process aids which may be of assistance include fluorocarbon mold release agents, methylacetylricinoleate, stearic acid, polyethylene, polyethene wax, mixtures of natural waxes and wax derivatives, vegetable fats, partially oxidized polyethylene, etc. Others will be apparent to those skilled in the art.

SINTERABLE PARTICULATE

The powdered beta"-alumina precursor particulate most useful in the practice of the method of this application has a broad particle size distribution, i.e. about 0.1–1500 microns, with a preferred average particle size of below about 3.5 microns. It has been found that using a broad distribution of particle sizes permits better flow of the sacrificial binder-particulate compositions during molding. This precursor particulate is prepared by combining sodium carbonate, lithium nitrate and alpha-alumina, calcining and then milling for about 1 hour in a polyethylene container using high purity alumina balls to break down agglomerates. The ratio of the reagents is chosen so that the final product (powdered B"-alumina precursor particulate) preferably has a composition of a) 8.7% soda/0.7% lithia/90.6% alumina, or (b) 8.85% soda/0.75% lithia/90.4% alumina, or (c) 9.25% soda/0.25% lithia/90.5% alumina (% by weight). Other less suitable ratios of soda/lithia/alumina can be used in practicing the method of this invention.

The weight proportion of binder to particulate solids of beta"-alumina may vary widely, but is preferably as high as possible for dense bodies. Normally, the weight ratio of binder to beta alumina particulate solids will be about 1:2 to 1:7, more preferably for very dense bodies between about 1:4 to 1:6.

The following examples are presented by way of description of the process of the invention and to set forth the best mode contemplated by the inventors, but are not to be construed as limiting.

EXAMPLE 1

Figure 1:
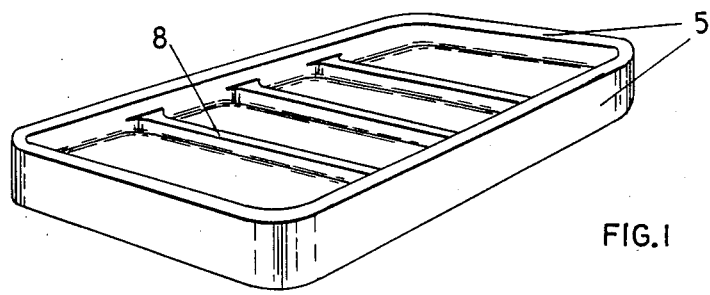
FIGS. 1, 2 and 3 illustrate the preferred green body made in accordance with this invention.

A plate-type, green body as illustrated in FIGS. 1, 2 and 3 was made by compression molding of binder-/ceramic compositions. The binder/beta"-alumina precursor compositions were prepared by combining the following ingredients:

| Material | Amount, grams |
| --- | --- |
| Solprene 414C | 5.36 |
| Agerite Resin D | 0.53 |
| Sunoco Wax 3420 | 1.04 |
| Sunoco Wax 4412 | 0.81 |
| Styron 495 | 0.66 |
| Picco 6140-3 | 0.68 |
| Flexon 845 | 0.43 |
| Shellflex 371 | 1.47 |
| Flexricin P-4 | 0.94 |
| Powdered beta"-alumina precursor (8.85% soda/ 0.75% lithia/90.4% alumina) | 50.00 |

(a) The preparation of a powdered beta"-alumina precursor: Dried samples of sodium carbonate and lithium nitrate were mixed with alumina and milled for one hour in a polyethylene container using high-purity alumina balls. The ratio of reagents was chosen so that the final products would have compositions of 8.7% soda/0.7% lithia/90.6% alumina, 8.85% soda/0.75% lithia/90.4% alumina, and 9.25% soda/0.25% lithia/90.5% aluminia.

In order to develop the proper rheological properties of the molding composition, two different batches of beta"-alumina precursor were prepared for each composition and subsequently blended. One batch was prepared using Linde C alumina, average particle size of one micrometer, and the other was made using Alcoa XA-16-SG, a ground alpha-alumina powder having a wide distribution of particle sizes ranging from about forty micrometers to less than one micrometer. The powders were calcined separately for two hours at 1260° C. in platinum crucibles. On cooling, the powders have individually crushed and milled for one hour in polyethylene vessels using alumina balls. The two powders were combined in equal parts in a plastic vessel containing alumina balls and shaken together for 30 minutes on a paint shaker.

(b) Mixing of powder with the binder ingredients: The mixing of binder compositions was carried out on an 80×180 mm two roll vented research mill. The mill rolls were electrically heated with individual heat controls and chrome coated. The mill speed was 3.2 m per minute and had a friction ratio of 1.4 to 1. The gap between the rolls varried from 0.17 to 0.76 mm during mixing. The temperature of both rolls was set at 310° F. and allowed to stabilize before mixing the ingredients of a typical binder particulates composition:

| Material | Amount, grams |
| --- | --- |
| Solprene 414C | 5.36 |
| Agerite Resin D | 0.53 |
| Sunoco Wax 3420 | 1.04 |
| Sunoco Wax 4412 | 0.81 |
| Styron 495 | 0.66 |
| Picco 6140-3 | 0.68 |
| Flexon 845 | 0.43 |
| Shellflex 371 | 1.47 |
| Flexricin P-4 | 0.94 |
| Powdered beta"-alumina precursor 8.85%/soda/ 0.75% lithia/90.4% alumina | 50.00 |

The order of addition of binder ingredients and specific conditions used in the mixing steps are listed below:

1. The roll gap was set at 0.17 mm and the thermoplastic elastomer (Solprene 414) was added. As soon as a Solprene 414 melt was formed on the rolls, 5% by wt. of the beta"-alumina precursor and all of the Agerite Resin D were slowly added. These ingredients were allowed to mix for about 40 seconds before proceeding.
2. The mill rolls were periodically opened and the rest of the beta"-alumina precursor was added. The gap between the two rolls was maintained at 0.70–0.76 mm by the completion of the beta"-alumina addition.
3. A petroleum (Sunoco 3420) was added slowly and the banded material was cut twice. The temperature of the rolls was raised to 320° F. and the remaining petroleum (Sunoco 4412) was added slowly. The powdery material falling off the mill rolls was placed on the mill rolls continuously. Banded material at edges of rolls was cut with a sharp knife and placed on the center of the rolls repeatedly.
4. After the mill rolls were closed to 0.5 mm, the polystyrene (Styron 495) and polyidene resin (Picco-6140-3) were added to the mix in that order. The mix was still crumbling at this stage. The banded material at edges of rolls was cut continuously and placed in center of rolls until completion of mixing.
5. The temperature was reduced to 290° F. before addition of the petroleum oils (Flexon 845 and Shellflex 371). The oils were added one-third at a time with cutting of the banded material between additions. This was followed with cutting of the material at the edges of the rolls and returning the cut and crumbled material to the middle of rolls.

6. The mill rolls were opened to 0.65 mm, and then the flexricin P-4 was added slowly while cutting the banded material.
7. Upon completion of the addition of all ingredients, the mix was cut at the edges of the rolls and sliced in the middle of the rolls for five minutes. The cut material was returned to the center of the rolls.
8. Mixing was completed with 40-45 minutes after which the temperature was reduced to 250° F. to allow easier removal of the material from the mill rolls.
9. The mill was set at a speed of 0.1 m per minute and the mix was sliced off the mill and transferred to the branch for cooling and preforming.

At the completion of the mixing cycle, the binder composition was homogeneous and tough.

(c) Preparation of preforms from the mixed composition: Preforms were either cut directly from freshly mixed material or from remixed material. Remixing was required to combine ingredients which had undergone phase separation and was assumed necessary if the material was more than four hours old. To accomplish the remixing, the mixed material is returned to the heated mill rolls (150° C.) and mixed for five minutes with continuous cutting of the banded stock. The mill was run at a speed of 3.2 m per minute with an initial gap between rolls of 0.75 mm. For preforming, the mill gap was increased to 2.9 mm and the edges of the band were smoothed by moving material from the edges to the center of the band. When a smooth sheet had been established, the roll temperature was reduced to 90° C. to allow removal of the mixture from the rolls. After removal from the rolls, the strip was pressed flat on a metal bench. Preforms were prepared from the hot material by cutting around a metal template (33.8 mm × 108 mm). In addition, strips were cut for use in filling the edge cavities of the mold. The total preform weight was adjusted to be in the ranges 84.0-86.0 grams.

(d) Molding of plate-type electrolyte: The plate-type electrolytes were formed by compression molding using a brass mold which was split in the plane of the plate along its centerline. The plate molds used had a cavity length and width dimensions (inner edge to inner edge) of about 128 mm and 67.1 mm respectively. The assembled mold had a flat surface cavity depth of about 1.65 mm. To prevent sticking of the binder/ceramic composition, it was necessary to spray the mold cavity surfaces with a fluorocarbon mold release agent (Cadco, Formula 61, sold by Cadilac Plastics and Chemical Company). Both halves of the mold were preheated to 137° C. on the platens of an electrically heated hydraulic press (K-M Hydraulic Press, Model No. 3212). After the mold halves had reached temperature, three rectangular preforms are stacked in the middle of one mold plate, (preferrably bottom mold plate A of FIG. 4) and four strips of material were placed in the edge recesses of the top mold plate and four strips were placed in the edge recesses of the bottom mold plate. The mold was then assembled, placed in the press and the platens closed sufficiently so that the platens just contacted both sides of the mold. The molding composition was preheated for 25 minutes with the stock temperature reaching 134° C. The force on the mold was then raised to 8000 lbs. and held for 5 minutes at which point the force was increased to 9500 lbs. for an additional 2.5 minutes, wherein excess material is forced out of the mold. In this preferred molding process, a force of between about 4100 lbs and about 12,000 lbs (corresponding to a pressure of about 125-360 lbs/in$^2$) is required for optimal molding of the green bodies. At a force of less than about 4100 lbs, the composition does not flow sufficiently to fill the mold. At forces in excess of about 12,000 lbs, the green bodies contain cracks. Preferably, the force applied to the mold plates during molding of the green body is between about 7050 and 9500 lbs (corresponding to a pressure of between about 215-295 lbs/in$^2$. After releasing the pressure, the mold was cooled to 25° C. over a period of 3-4 hours. The mold was opened with the aid of set screws leaving the green body firmly attached to the bottom plate of the mold. The mold plate was then heated to 50° C. to make the binder composition more flexible and aid in demolding. Demolding was accomplished with compressed air. The green bodies were then stored in sealed polyethylene bags until needed for burn out and sintering. These plates retain their shape during further processing.

Binder removal of molded, green plates was accomplished by partially embedding them in a packing powder having the same composition as the (broad particle size distribution) beta″-alumina precursor and placing in a furnace. The packing powder had the dual purposes of moderating temperature gradients and wicking condensable reaction products away from the plate surface. The furnace was heated at a rate of 12° C. per hour to 500° C. and then at a rate of 50° C./hour to 1050° C. The cooling of plate was carried out at the rate of 50° C. per hour. Faster heating cycles could be used with furnaces having no thermal gradients.

After burn out of binder ingredients, each plate was placed in a closed, reusable platinum vessel for sintering. The vessel containing the plate was placed in an electrically heated furnace. The furnace was heated at a rate of 62° C. per hour to 1590° C. and held there for 25 minutes. Then the furnace was allowed to cool. The sintered plate-type electrolytes retained their shape during sintering. They have properties similar to properties of less complexly shaped beta″-alumina articles made by isostatic pressing and sintering.

EXAMPLE 2

The procedures of Example 1 are repeated with the single difference that the composition of powdered beta″-alumina precursor is different. The powdered beta″-alumina precursor consists of 8.7% $Na_2O$, 0.70% $Li_2O$ and 90.6% Alumina. After mixing the ingredients, green bodies were prepared by compression molding.

EXAMPLE 3

The procedures of Example 1 are repeated with the exception that the composition of powdered beta″-alumina precursor is different. The powdered beta″-alumina precursor contains 9.25% $Na_2O$, 0.25% $Li_2O$ and 90.5% $Al_2O_3$. Upon mixing the ingredients and molding the mix, green bodies were prepared.

EXAMPLE 4

Moldable compositions were prepared by combining the following ingredients:

| Material | Amount, grams |
| --- | --- |
| Solprene 414C | 5.96 |
| Agerite Resin D | 0.53 |

-continued

| Material | Amount, grams |
| --- | --- |
| Sunoco Wax 3420 | 0.81 |
| Sunoco Wax 4412 | 0.81 |
| Styron 495 | 0.66 |
| Picco 6140-3 | 0.68 |
| Shellflex 371 | 1.58 |
| Flexricin P-4 | 0.94 |
| Powdered beta"-alumina precursor ($Na_2O$ 8.85%, $Li_2O$ 0.75% and $Al_2O_3$ 90.40%) | 50.00 |

This composition contained more elastomer (Solprene 414C) but lower levels of some of the other binder ingredients. After mixing, preforming and molding according to procedures of Example 1, green, tough plates resulted. These plates were processed further according to methods described in Example 1.

EXAMPLE 5

Compositions containing higher levels of elastomer (Solprene 414C) were prepared by combining the following materials:

| Material | Amount, grams |
| --- | --- |
| Solprene 414C | 7.15 |
| Agerite Resin D | 0.27 |
| Sunoco Wax 3420 | 0.58 |
| Sunoco Wax 4412 | 0.81 |
| Styron 495 | 0.53 |
| Picco 6140-3 | 0.54 |
| Shellflex 371 | 1.14 |
| Flexricin P-4 | 0.94 |
| Powdered beta"-alumina precursor ($Na_2O$ 8.85%, $Li_2$ 0.75% and $Al_2O_3$ 90.40%) | 50.00 |

After mixing the ingredients according to procedure of Example 1, a tough, uniform sheet was formed. Following preforming the material was compression molded according to procedure of Example 1 but the flow characteristics were slightly inferior to those of material of Example 1.

EXAMPLE 6

The following ingredients were combined as in Example 1 for preparing mixes with lower level of powdered beta"-alumina precursor:

| Material | Amount, grams |
| --- | --- |
| Solprene 414C | 5.17 |
| Agerite Resin D | 0.58 |
| Sunoco Wax 3420 | 1.25 |
| Sunoco Wax 4412 | 1.00 |
| Styron 495 | 0.72 |
| Picco 6140-3 | 0.73 |
| Flexon 845 | 0.59 |
| Shellflex 371 | 1.84 |
| Flexricin P-4 | 1.03 |
| Powdered beta"-alumina precursor ($Na_2O$ 8.85%, $Li_2O$ 0.75% and $Al_2O_3$ 90.04%) | 50.00 |

After mixing the various ingredients, flat sheets of material were made. These sheets were homogeneous and slightly softer than the material of Example 1. Upon preforming as in Example 1 the material was moldable.

EXAMPLE 7

Compositions having higher level of powdered beta"-alumina precursor were prepared by combining the following amounts of ingredients:

| Material | Amount, grams |
| --- | --- |
| Solprene 414C | 4.40 |
| Agerite Resin D | 0.49 |
| Sunoco Wax 3420 | 1.06 |
| Sunoco Wax 4412 | 0.85 |
| Styron 495 | 0.61 |
| Picco 6140-3 | 0.63 |
| Flexon 845 | 0.49 |
| Shellflex 371 | 1.56 |
| Flexricin P-4 | 0.87 |
| Powdered beta"-alumina precursor ($Na_2O$ 8.85%, $Li_2O$ 0.75% and $Al_2O_3$ 90.40%) | 50.00 |

After mixing the ingredients, preforming the mix and compression molding it according to procedures of Example 1 the resulting plates had cracks, improper dimensions and voids. The improper dimensions and voids were due to incomplete closure of mold due to poor flow.

EXAMPLE 8

Example 1 was repeated with the exception that the amount of Solprene was lowered and amounts of other binder ingredients were increased as follows:

| Material | Amount, grams |
| --- | --- |
| Solprene 414C | 4.80 |
| Agerite Resin D | 0.53 |
| Sunoco Wax 3420 | 1.15 |
| Sunoco Wax 4412 | 0.90 |
| Styron 495 | 0.70 |
| Picco 6140-3 | 0.70 |
| Flexon 845 | 0.54 |
| Shellflex 371 | 1.70 |
| Flexricin P-4 | 0.94 |
| Powdered beta"-alumina precursor ($Na_2O$ 8.85%, $Li_2O$ 0.75% and $Al_2O_3$ 90.40%) | 50.00 |

After mixing and preforming according to Example 1, the preforms were molded as in Example 1. After demolding, the plate had some minor defects.

EXAMPLE 9

The procedure of Example 1 was repeated with the exception that a triangular preform was employed for compression molding of plates. The plate-type green bodies had cracks and deficient edges.

EXAMPLE 10

The procedures of Examples 1–6 were repeated with these changes: A rectangular preform covering both the flat section of mold and outer channels was used for molding plates. These green bodies had deficient edges.

EXAMPLE 11

The procedures of Examples 1–6 were repeated with this change: The force on mold during molding was 20,000 lbs. After demolding the plate, it had a large number of cracks.

EXAMPLE 12

The procedure of Example 1 was repeated with the following change: The force on the mold during molding was 4000 lbs. The resulting plates had deficient edges.

EXAMPLE 13

The procedure of Example 1 was repeated with the following exception: The powdered beta"-alumina precursor was prepared by using only Linde C alumina, soda and lithia. The molded plates had a couple of small cracks and edges were slightly deficient. The flow behavior of this composition was inferior to the material of Example 1.

EXAMPLE 14

The procedure of Example 13 was repeated with the following changes: The powdered beta"-alumina precursor was prepared by using only Linde C alumina, soda and lithia. The powder contained also 1.5% water. The flow behavior of this composition was inferior to the flow of composition of Example 13. The molded plates had many cracks. The material was crumbling during preforming.

EXAMPLE 15

The procedures of Examples 1–6 were repeated with the following change: Both of the mold surfaces were coated with another mold release agent (mold whiz 249, emulsified polymeric resin) in place of fluorocarbon (Cadco Formula 61). After molding, the plate had many cracks and could not be removed from mold. This release agent interacts with the plate and mold and changes the color of binder/ceramic material from gray to dark-brown.

EXAMPLE 16

The procedures of Examples 1–6 were repeated with the following changes: Both mold surfaces were coated with Freekote 34h (polymeric resin, non-silicone, manufactured by Frekote Inc.) in place of fluorocarbon (Cadco Formula 61). The film on the mold surfaces was discontinuous. Removal of plate from mold was difficult.

EXAMPLE 17

The procedures of Example 1–6 were repeated with the exception of molding temperature. The temperature of material during molding was 125° C. The flow of material was not equivalent to flow of material in Examples 1–6. The plates had some defects.

EXAMPLE 18

The procedures of Examples 1–6 were repeated with the exception of molding temperature. The material was preheated for 1 hour and the temperature of material was 160° C. during molding. The parts had small defects.

EXAMPLE 19

Example 1 was repeated with the following exception: The material used for molding was aged for 15 days and then freshened on the mill for 5 minutes. After preforming it, sound plates were made by compression molding.

EXAMPLE 20

Example 1 was repeated with the exception that the following ingredients were used at the specified amounts:

| Material | Amount, grams |
|---|---|
| Solprene 414C | 6.55 |
| Irganox 1010 | 0.30 |
| Irganox 1024 | 0.23 |
| Picco 6140-3 | 0.68 |
| Flexon 845 | 1.42 |
| Shellflex 371 | 1.80 |
| Flexricin P-4 | 0.80 |
| Powdered beta"-alumina precursor ($Na_2O$ 8.85%, $Li_2O$ 0.75% and $Al_2O_3$ 90.40%) | 50.00 |

After mixing and preforming, the material was used in compression molding. The molded plates had small cracks.

In the above Examples 1–20, Solprene 414C is a thermoplastic elastomer manufactured by Phillips Petroleum. It is a radial block compolymer of styrene and butadiene with a molecular weight ($\overline{M}_w$) of about 160,000. The 414C has a specific gravity of 0.95, melt flow of 72 (grams/10 min. at 190° C. and apparent viscosity of 46,000 poise at 10 seconds$^{-1}$ at room temperature. Agerite Resin D is an antioxidant available from Vanderbilt Company; it is a polymerized 1,2-dihydro-2,2,4-trimethyl quinoline. Typical properties of Agerite Resin D are specific gravity = 1.06; softening point + 74° C.; and very soluble in acetone. Sunoco Wax 3420 is a paraffinic wax that melts at 137° F. Specific gravity at 60° F. is 1.2 g/cc and kinematic viscosity is 3.6 centistokes to 210° F. Sunoco Wax 4412 is a paraffinic wax that melts at 145° F. Specific gravity is 0.925 and 60° F. and kinematic viscosity at 210° F. is 4.2 centistokes. Styron 495 is a polystyrene available from Dow Chemical Company; it has a vicat softening point of 207° F., melt flow rate of 3.5 grams/10 min. and specific gravity of 1.05 at 60° F. Sytron 495 has a molecular weight ($\overline{M}_w$) of about 250,000. Picco 6140-3 is a polyindene available from Hercules; its melt viscosity is 10 poises at 205° C. The softening point is 140° C. and density 1.07 and 25° C. Flexon 845 is a paraffinic petroleum oil from Exxon Chemical Company. Flexon 845 has a viscosity of 230 SUS at 210° F. and Aniline Point is 242° F. Shellflex 371 is a paraffinic-naphthenic oil available from Shell Oil Company. Shellflex has a specific gravity of 0.897 at 60° F.; it has 49% paraffinic carbon, 50% naphthenic carbon and 1% aromatic carbon. The molecular weight is 400, viscosity at 100° C. is 535 S.U.S., and Aniline Point is 212° F. Flexricin P-4 is methyl acetyl ricinoleate its specific gravity is 0.936 and boiling point at 2 mm is 185° C. Its molecular weight is 346. Irganox 1010 and Irganox 1024 are antioxidants manufactured by Ciba-Geigy In view of this disclosure, many modifications of this invention will be apparent to those skilled in the art. It is intended that all such modifications which fall within the true scope of the invention will be included with the terms of the appended claims.

What is claimed is:

1. A method for manufacturing dimensionally precise, highly contoured green bodies which comprise a sacrificial binder composition densely packed with powdered beta"-alumina precursor particulate solids, by compression molding a mixture of said beta"-alumina precursor particulate solids and said sacrificial binder, which method comprises:

providing a mixture of about 40–60 volume percent sinterable particulate solids consisting essentially of a particle size distribution of powdered beta"-alumina precursor particulate comprising alpha-alumina and about 60–40 volume percent organic sacrificial binder in a mold member coated, at least in part, with a mold release agent and having a cavity and a recess in the cavity, the mixture being located such that a first amount is provided in the cavity adjacent the recess and a second amount is provided in said recess;

applying heat and pressure to the first and second amounts between said mold member and another mold member, coated at least in part with a mold release agent, to urge together the first and second amounts; and maintaining the heat and pressure for a time sufficient to knit together portions of the first and second amounts in conformity with the cavity; wherein said binder employed in said method consists essentially of:

(a) a thermoplastic block copolymer component selected from the group consisting of linear, radial and linear and radial block copolymers, said block copolymers having (i) a first aromatic block, which is glassy or crystalline at 20°–25° C., has (ii) a softening point between about 80°–250° C. and a second aliphatic block which is different from said first block and behaves as an elastomer at temperatures between about 15° C. below and about 100° C. above said softening point of said first block;

(b) two oils having different boiling point ranges and being selected from the group consisting of oil, at least about 75 percent by weight of which boils in a range between about 285°–260° C., and which has a viscosity of between about 30–220 SUS at 100° C. and an aniline point in a range between about 75°–125° C.;

(c) two waxes having different boiling point ranges and being selected from the group consisting of wax which melts at a temperature in a range between about 50° C.–80° C., at least 75 percent by weight of which boils at temperatures in a range between about 315° C.–490° C.;

(d) a first stiffening thermoplastic polymer which is glassy or crystalline at 20°–25° C., has a softening point between about 80°–250° C., and comprises aromatic monomeric units associable with block copolymer (a); and (e) a second stiffening thermoplastic polymer, different from said first polymer and which is glassy or crystalline at 20°–25° C., has a softening point between about 80°–250° C. and comprises aromatic monomeric units associable with block copolymer (a); the weight of (a) being greater than (b) and (c) combined, greater than (d) and (e) combined and greater than about two times (b), (c), (d) or (e) alone.

2. A method in accordance with claim 1, wherein said block copolymer component comprises a radial block copolymer.

3. A method in accordance with claim 2, wherein said first block comprises a polymer of styrene.

4. A method in accordance with claim 3, wherein said second block comprises a polymer of butadiene.

5. A method in accordance with claim 4, wherein said polymer of butadiene comprises an unsaturated polymer.

6. A method in accordance with claim 1, wherein said particle size distribution of said powdered beta"-alumina percursor particulate comprises a particle size distribution of between about 0.1 and about 1500 microns.

7. A method in accordance with claim 6, wherein the average particle size of said beta"-alumina precursor particulate is below about 3.5 microns.

8. A method in accordance with claim 7, wherein said first stiffening polymer comprises a polystyrene thermoplastic.

9. A method in accordance with claim 8, wherein said second stiffening polymer comprises a polyindene thermoplastic.

10. A method in accordance with claim 2, wherein said radial block copolymer has a molecular weight ($\overline{M}_w$) of about 100,000–200,000.

11. A method in accordance with claim 10, wherein said radial block polymer has a specific gravity between about 0.9–1.

12. A method in accordance with claim 11, wherein said radial block polymer has an apparent viscosity of between about 40–50 thousand poise at 10 seconds$^{-1}$ at about 20°–25° C.

13. A method in accordance with claim 1, wherein said method further comprises driving off said sacrifical binder from said green bodies with heat and thereafter sintering said particular solids of said body.

14. A method for manufacturing dimensionally precise, highly contoured green bodies which comprise a sacrificial binder composition densely packed with powdered beta"-alumina precursor particulate solids, by compression molding a mixture of said beta"-alumina precursor particulate solids and said sacrificial binder, which method comprises:

providing a mixture of about 40–60 volume percent sinterable particulate solids consisting essentially of a particle size distribution of powdered beta"-alumina precursor particulate comprising alpha-alumina and about 60–40 volume percent organic sacrificial binder in a mold member coated, at least in part, with a mold release agent and having a cavity and a recess in the cavity, the mixture being located such that a first amount is provided in the cavity adjacent the recess and a second amount is provided in said recess;

providing said mixture in a second mold member coated, at least in part, with a mold release agent and having a cavity and a recess adjacent the perimeter of the mold in the cavity, said mixture being located such that a third amount is provided in the recess of said second mold member; closing said mold members such that said recesses of said first and second mold members are aligned; and applying heat and pressure to said amounts between said mold members to urge together said first, second and third amounts, and maintaining the heat and pressure for a time sufficient to knit together portions of the first and second amounts in conformity with the cavity; wherein said binder employed in said method consists essentially of:

(a) a thermoplastic block copolymer component selected from the group consisting of linear, radial and linear and radial block copolymers, said block copolymers having (i) a first aromatic block, which is glassy or crystalline at 20°-25° C., has (ii) a softening point between about 80°-250° C. and a second aliphatic block which is different from said first block and behaves as an elastomer at temperatures between about 15° C. below and about 100° C. above said softening point of said first block;

(b) two oils having different boiling point ranges and being selected from the group consisting of oil, at least about 75 percent by weight of which boils in a range between about 285°-560° C., and which has a viscosity of between about 30-220 SUS at 100° C. and an aniline point in a range between about 75°-125° C.;

(c) two waxes having different boiling point ranges and being selected from the group consisting of wax which melts at a temperature in a range between about 50° C.-80° C., at least 75 percent by weight of which boils at temperatures in a range between about 315° C.-490° C.;

(d) a first stiffening thermoplastic polymer which is glassy or crystalline at 20°-25° C., has a softening point between about 80°-250° C., and comprises aromatic monomeric units associable with block copolymer (a); and (e) a second stiffening thermoplastic polymer, different from said first polymer and which is glassy or crystalline at 20°-25° C., has a softening point between about 80°-250° C. and comprises aromatic monomeric units associable with block copolymer (a); the weight of (a) being greater than (b) and (c) combined, greater than (d) and (e) combined and greater than about two times (b), (c), (d) or (e) alone.

15. A method in accordance with claim 14, wherein said second mold member has parallel channels in said cavity aligned perpendicular to length of said mold member.

16. A method in accordance with claim 15, wherein said pressure is between about 125 lbs/in$^2$ and 370 lbs/in$^2$.

17. A method in accordance with claim 16, wherein said pressure is between about 215 lbs/in$^2$ and about 295 lbs/in$^2$.

18. A method in accordance with claim 14, wherein said particle size distribution of said powdered beta''-alumina percursor particulate comprises a particle size distribution of between 0.1 and about 1500 microns.

19. A method in accordance with claim 18, wherein the average particle size of said beta''-alumina percursor particulate is below about 3.5 microns.

20. A method in accordance with claim 14, wherein said radial block copolymer comprises blocks of polystyrene and blocks of butadiene.

21. A method in accordance with claim 20, wherein said block copolymer has a viscosity of about 40-50 thousand poises at 10 seconds$^{-1}$ at about 20°-25° C. and a molecular weight ($M_n$) between about 100,000-200,000.

22. A method in accordance with claim 21, wherein said radial block copolymer comprises about 30-50% by weight styrene.

23. A method in accordance with claim 14, wherein said first stiffening polymer comprises polystyrene.

24. A method in accordance with claim 23, wherein said second stiffening polymer comprises polyindene thermoplastic resin.

25. A method in accordance with claim 14, wherein said method further comprising driving off said sacrificial binder from said green bodies with heat and thereafter sintering said particulate solids of said body.

* * * * *